United States Patent [19]

Kim

[11] Patent Number: 5,371,771
[45] Date of Patent: Dec. 6, 1994

[54] CIRCUIT FOR CALCULATING DC VALUE IN DIGITAL RECORDING AND REPRODUCING SYSTEM

[75] Inventor: Byeong-su Kim, Seoul, Rep. of Korea

[73] Assignee: Samsung Electronics Co., Ltd., Kyungki-do, Rep. of Korea

[21] Appl. No.: 111,948

[22] Filed: Aug. 26, 1993

[30] Foreign Application Priority Data

Aug. 31, 1992 [KR] Rep. of Korea .................. 92-15773

[51] Int. Cl.⁵ .............................................. G06M 3/02
[52] U.S. Cl. ......................................... 377/39; 377/2; 341/58; 341/59
[58] Field of Search ...................... 341/58-59; 377/2, 39

[56] References Cited

U.S. PATENT DOCUMENTS

| | | | |
|---|---|---|---|
| 4,988,999 | 1/1991 | Uehara et al. | 341/59 |
| 5,270,714 | 12/1993 | Tanaka et al. | 341/59 |

FOREIGN PATENT DOCUMENTS 0005231 1/1989 Japan ................................. 341/58

*Primary Examiner*—Margaret Rose Wambach
*Attorney, Agent, or Firm*—Sughrue, Mion, Zinn, Macpeak & Seas

[57] ABSTRACT

A circuit for calculating a DC value for use in a code conversion apparatus of a recording and reproducing system includes a first storing element, second storing element, parallel to serial convertor, selecting circuit and a DC value calculating circuit. The DC value calculating circuit includes a load pulse generator for generating a second clock signal and a load pulse which is frequency-divided by a predetermined value according to a master clock signal; a counter for loading a reference value by the signal supplied from the load pulse generator, and counting up/down the serial data supplied from the parallel to serial convertor; a detector for detecting of whether or not the value counted in the counter is the same as the reference value; third storing element for holding a previous input value when the reference value is the same as the value counted in the counter, and storing the value counted in the counter when the reference value is not the same as the value counted in the counter; and a comparator for comparing the magnitude of the signal supplied from the third storing element with the magnitude of the reference value and supplying the result value as a signal for controlling the operation of the selecting circuit.

5 Claims, 8 Drawing Sheets

| INFO WORD | CODE - | CDS- | CODE+ | CDS+ |
|---|---|---|---|---|
| 0 0 0 0 | 0 0 0 0 0 | −5 | 1 1 1 1 1 | +5 |
| 0 0 0 1 | 0 0 0 0 1 | −3 | 1 1 1 1 0 | +3 |
| 0 0 1 0 | 0 0 0 1 0 | −3 | 1 1 1 0 1 | +3 |
| 0 0 1 1 | 0 0 0 1 1 | −1 | 1 1 1 0 0 | +1 |
| 0 1 0 0 | 0 0 1 0 0 | −3 | 1 1 0 1 1 | +3 |
| 0 1 0 1 | 0 0 1 0 1 | −1 | 1 1 0 1 0 | +1 |
| 0 1 1 0 | 0 0 1 1 0 | −1 | 1 1 0 0 1 | +1 |

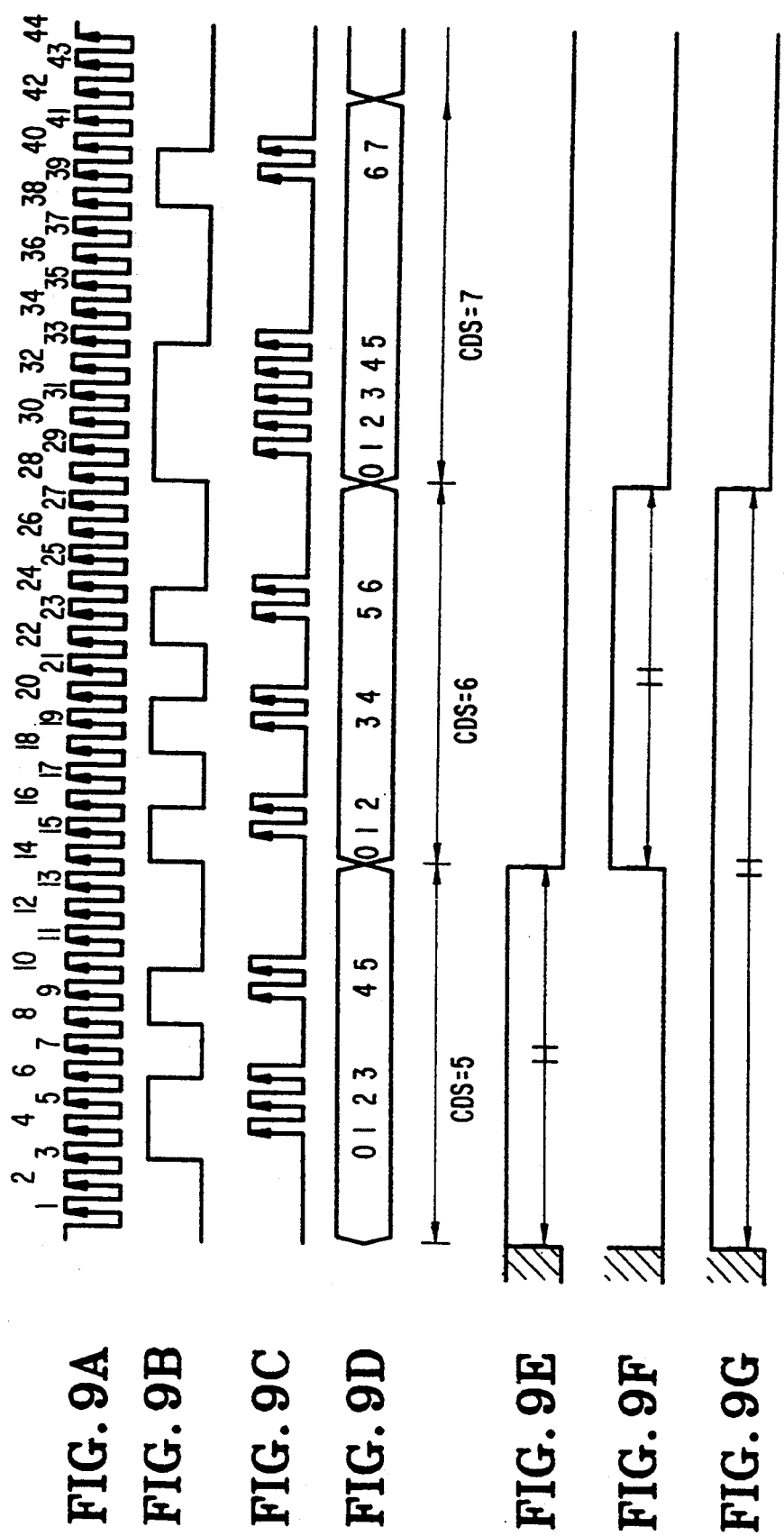

CIRCUIT FOR CALCULATING DC VALUE IN DIGITAL RECORDING AND REPRODUCING SYSTEM

BACKGROUND OF THE INVENTION

The present invention relates to a circuit for calculating a DC value applied to a code conversion control apparatus for use in a channel coding method of a digital recording and reproducing system.

Generally speaking, a digital recording and reproducing system should solve the following problems that are basically caused by a video head and tape, and a rotary transformer. 1) Since the rotary transformer cannot transmit, or pass a DC signal, the DC component of the digital signal, that is, the DC levels which represent binary "1" and "0" logic conditions are cut off. This means that the digital signal is recorded without its original DC component. 2) If the video head and the tape are operated in a high frequency area which is over a predetermined frequency, the digital signal cannot be recorded and reproduced by various losses. Accordingly, the minimum run length value $T_{min}$ should be large. 3) Since a magnetic recording and reproducing system has the characteristic of 6 dB/oct with respect to a low frequency area, a signal having a low frequency component cannot be recorded. Accordingly, the maximum run length value $T_{min}$ should be small. 4) The frequency bandwidth of a signal which is recorded and reproduced, according to 2) and 3) above, should be narrowed within a predetermined frequency bandwidth. Accordingly, the ratio ($T_{max}/T_{min}$ of the maximum run length vs. the minimum run length should be small. 5) During the reproducing period, the variation of DC levels should be suppressed for the benefit of the equalizer's design and the prevention of non-linear distortion. i.e., prevention of deviation from the linear region of a hysteresis curve.

SUMMARY OF THE INVENTION

Therefore, to solve the above problems, it is an object of the present invention to provide a circuit for calculating a DC value for use in a digital recording and reproducing system without relation to the increase and decrease of the bit number of a codeword in a code conversion control apparatus for controlling a cord conversion to select the optimum codeword by a DC value of a previous codeword of plural codewords, which are already established with respect to an information-word to reduce the variation of DC level.

To accomplish the above-mentioned object of the present invention, there is provided a circuit for calculating a DC value for use in a code conversion control apparatus system having first storing means for mapping plural codewords (symbol words) to an information-word applied by a predetermined unit and storing the codeword whose DC value is positive among the plural codewords corresponding to the information-word in order to control a code conversion for selecting the optimum codeword in a recording and reproducing operation, second storing means for storing the codeword whose DC value is negative among the plural codewords, serial to parallel converting means for converting the signal supplied from the first storing means or the second storing means to a format of serial data, selecting means for selectively supplying the signals output from the first storing means and the second storing means to the serial to parallel converting means, a DC value calculating circuit for calculating a DC value of the currently output codeword using the signal supplied from the serial to parallel converting means, and supplying a control signal to the selecting means to select the signal to be supplied to the serial to parallel converting means among the plural codewords corresponding to an information-word following the current information-word, the DC value calculating circuit comprising:

load pulse generating means for generating a second clock signal and load pulse frequency-divided by a predetermined value by a master clock signal;

counting means for loading a reference value by the signal supplied from the load pulse generating means, and counting up/down the serial data supplied from the serial to parallel converting means;

detecting means for detecting whether or not the value counted in the counting means is the same as the reference value;

third storing means for holding a previous input value when the reference value is the same as the value counted in the counting means, and storing the value counted in the counting means when the reference value is not the same as the value counted in the counting means; and comparing means for comparing the magnitude of the signal supplied from the third storing means with the magnitude of the reference value and supplying the result value as a signal for controlling the operation of the selecting means.

BRIEF DESCRIPTION OF THE DRAWINGS

The above object and other advantages of the present invention will become more apparent by describing in detail a preferred embodiment thereof with reference to the attached drawings in which:

FIGS. 9A through 9G are output waveform diagrams of the respective portions shown in FIG. 8.

DETAILED DESCRIPTION OF THE INVENTION

Hereinafter, the present invention will be described with reference to the accompanying drawings.

Figures 1, 2:
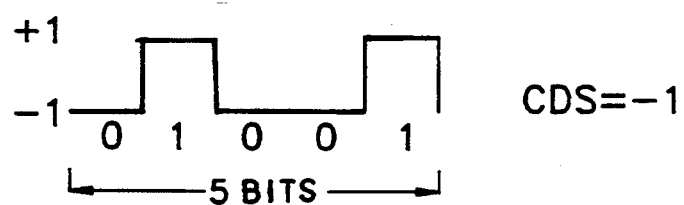
FIG. 1 is a concept diagram of codeword digital sum (CDS).
FIG. 2 is a table representing an example of applied information-words and their CDS values.

FIG. 1 is a concept diagram of CDS, which calculates the DC value of a codeword with respect to one information-word by being calculated as a DC value of −1 volt when the bit constituting the codeword is a binary "0," and as a DC value of +1 volt when it is a binary "1." FIG. 1 shows employment of the above-mentioned calculating theory, taking as an example the codeword "01001" (which is referred to a word), wherein the value of the CDS is equal to "−1."

FIG. 2 represents an example of the codeword to be mapped to an information-word, which uses a channel coding method for converting an information-word applied by one block unit to a symbol word according to a predetermined rule. Here, four bits are illustrated as one block unit as an example, but in general one block unit is composed of eight bits. Also, a five-bit codeword as a unit to be mapped is illustrated as an example, but a ten-bit or fourteen-bit codeword is generally used. The representative coding method for such a bit condition is an eight to fourteen modulation (EFM). The codeword with respect to the information-word is dependent on the predetermined value and is represented as two or more symbol words. But herein two codewords having a characteristic inverted to each other are used, and the codeword whose DC value is nearly close to "0" is selected and supplied among the codewords.

Figure 3:
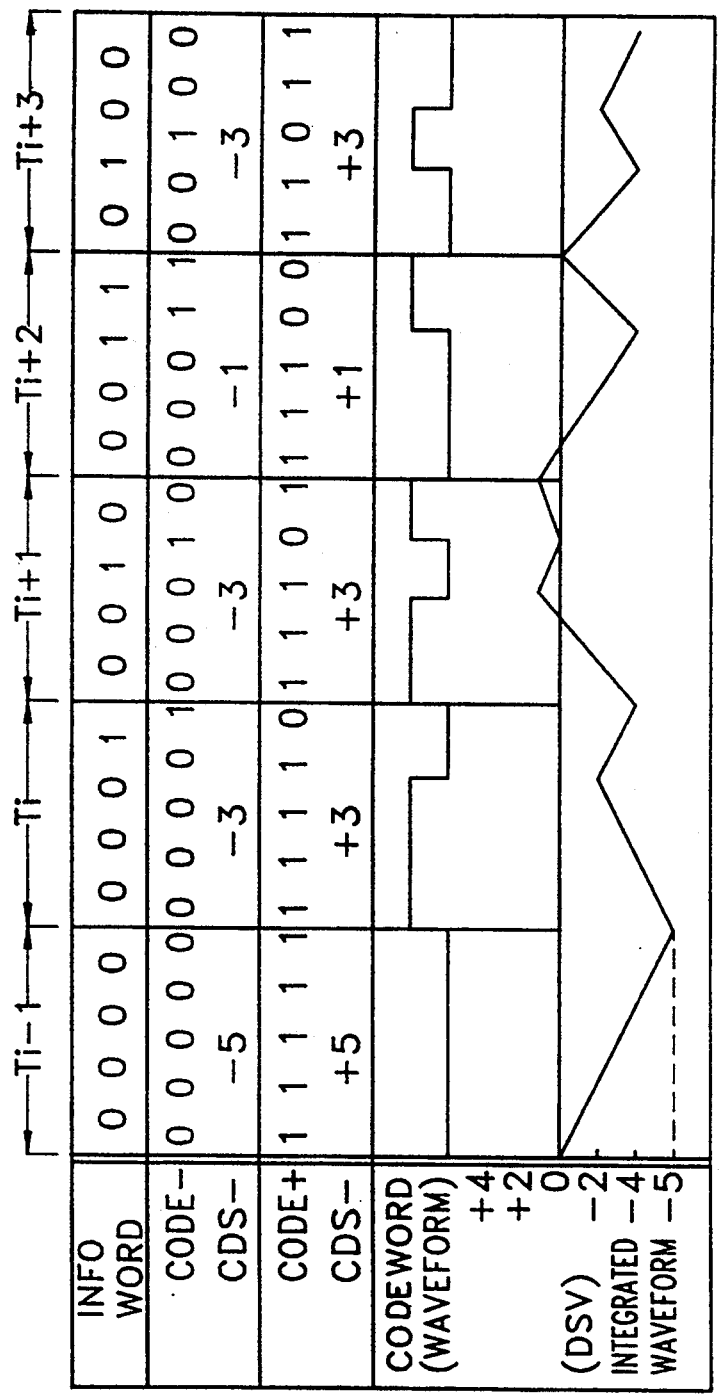
FIGS. 3A through 3E are concept diagrams about the DC value (DSV, digital sum variation) corresponding to the CDS value with respect to the information-word.

That is, the symbol word capable of mapping with respect to the information-word of "0000" can be "00000" and "11111," and one of these is selected and supplied as a codeword of the corresponding information-word. But if the above-mentioned information-word is first applied, any one of the above-mentioned two codewords can be selected, .with no big problem. If a codeword whose CDS value is equal to "−5" is selected as shown in FIG. 3, it means that there are more binary "0's" than there are binary "1's" in the currently selected codeword. Accordingly, the codeword which has fewer "0's" is selected as a codeword with respect to the following information word.

Accordingly, codeword "11110" whose CDS value is equal to +3 is selected among "00001" and "11110" as that with respect to the following information-word "0001." Such codeword selection will be described in more detail through a circuit diagram which will be described afterwards.

FIGS.

FIGS. 3A through 3E show the codeword considering the DC level when a codeword with respect to the information-word is established shown in FIG. 2, and its DSV value. DSV is the DC value at a certain moment when the CDS of the codewords being received successively are cumulated continuously.

Figure 4:
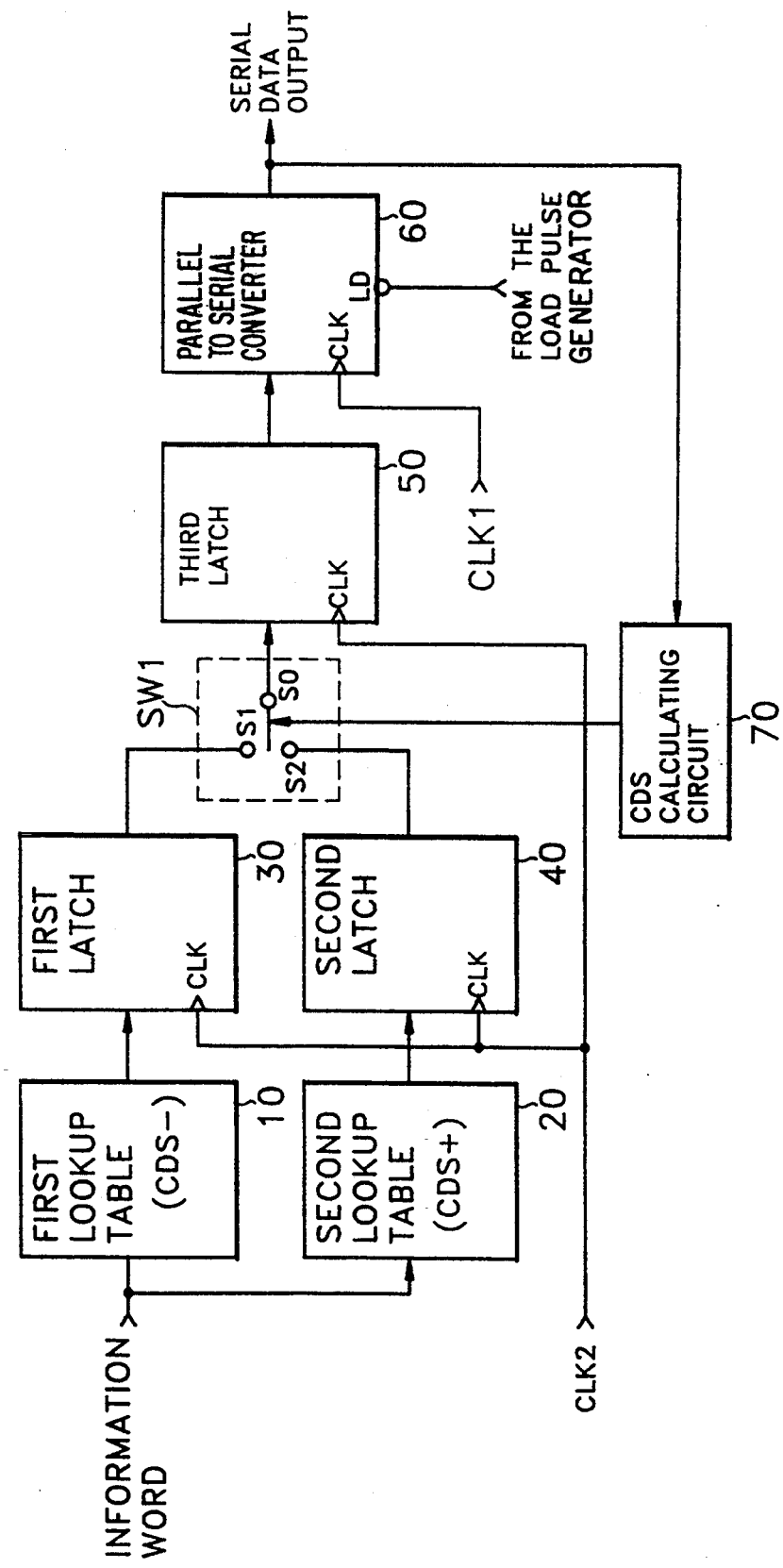
FIG. 4 is a block diagram of an embodiment of a code conversion control apparatus to which a DC value calculating circuit according to the present invention is applied.

FIG. 4 is a block diagram of a code conversion control apparatus to which a CDS calculating circuit according to the present invention is applied and the composition is as follows.

In FIG. 4, the code conversion control apparatus comprises a first look-up table 10 for reading a negative codeword corresponding to an information word for code-conversion, a second look-up table 20 for reading a positive codeword corresponding to the information-word applied to first look-up table 10, a first latch 30 for synchronizing the signal supplied from first look-up table 10 with the signal supplied from the second look-up table 20, a second latch 40 for synchronizing the signal supplied from the second look-up table 20 with the signal supplied from first look-up table 10 in the same manner as that first latch 30, a selecting means SW1 for supplying selectively the signals supplied from first latch 30 and second latch 40, a third latch 50 for storing temporarily the signals supplied from selecting means SW1 to output the stored signals as in latches 30 and 40, a parallel to serial converter 60 for converting parallel data supplied from third latch 50 to serial data, a CDS calculating circuit 70 for receiving the serial data supplied from parallel to serial converter 60, and calculating a CDS value, and supplying a signal controlling the operation of selecting means SW1 in accordance with the calculated result.

Here, first, second and third latches 30, 40 and 50 are synchronized by clock signal CLK2 which is obtained by dividing-by-fourteen a master clock signal CLK1. The clock signal of parallel to serial converter 60 is master clock signal CLK1, and converter 60 loads the clock signal by a load pulse supplied from a load pulse generator 71 which will be described afterwards.

Figure 5:
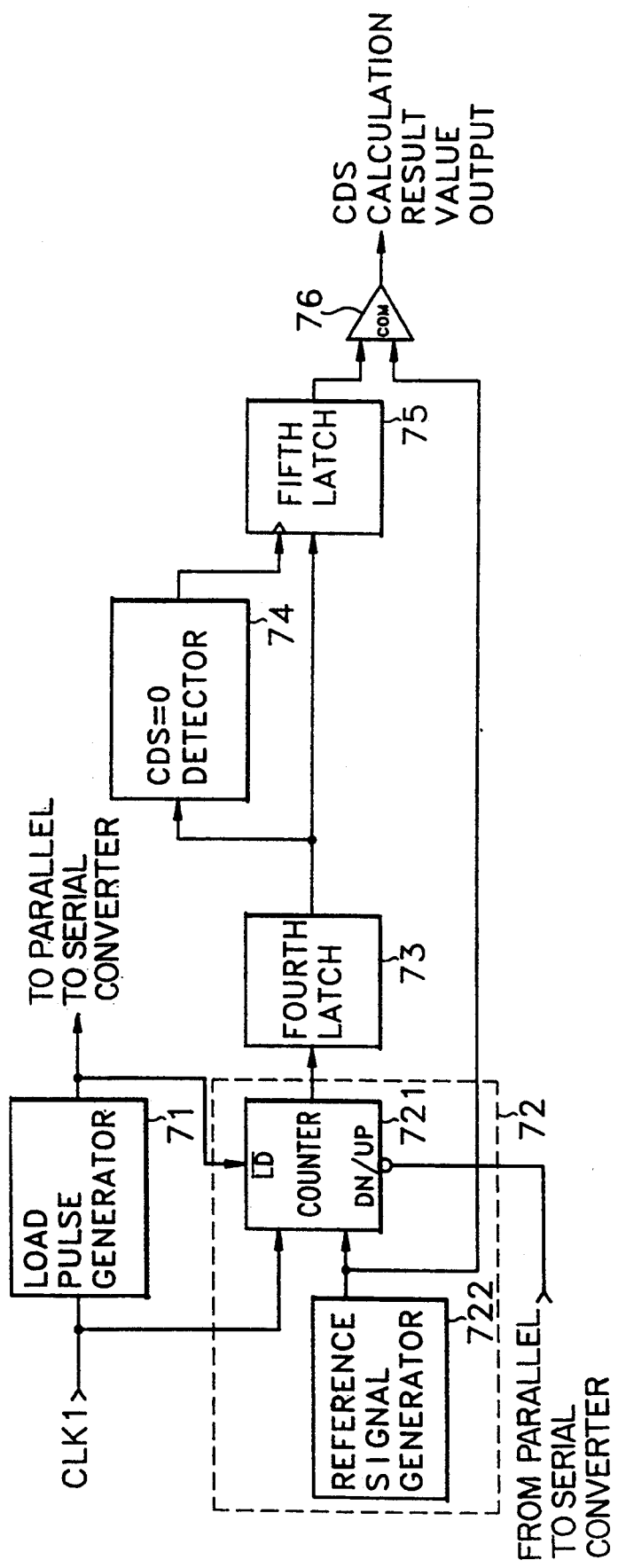
FIG. 5 is a block diagram of a DC value calculating circuit according to the present invention.

FIG. 5 is a block diagram showing a CDS calculating circuit 70 according to the present invention.

In FIG. 5, the CDS calculating circuit 70 comprises a load pulse generator 71 for receiving master clock signal CLK1 and generating a load pulse, counting means 72 for receiving master clock signal CLK1 as an input signal and receiving a signal supplied from load pulse generator 71 as a control signal, a forth latch 73 for storing temporarily the signal supplied from counting means 72 as in latches 30, 40 and 50 of FIG. 4, a fifth latch 75 for receiving the signal supplied from fourth latch 73, a detector 74 for receiving the signal supplied from fourth latch 73, and for detecting if the CDS value is zero, and supplying the result value to fifth latch 75, a comparator 76 for receiving the signal supplied from fifth latch 75, and for comparing it with a predetermined reference value, and supplying the CDS calculation result value to selecting means SW1.

Here, counting means 72 comprises a reference signal generator 722 for generating a predetermined reference value, a counter 721 for counting up/down, depending on the signal supplied from parallel to serial converter 60 of FIG. 4, and for loading the signal supplied from reference signal generator 722 by the signal supplied from load pulse generator 722, and for counting master clock signal CLK1. Also, the reference voltage of comparator 76 is the signal supplied from reference signal generator 722.

Figure 6:
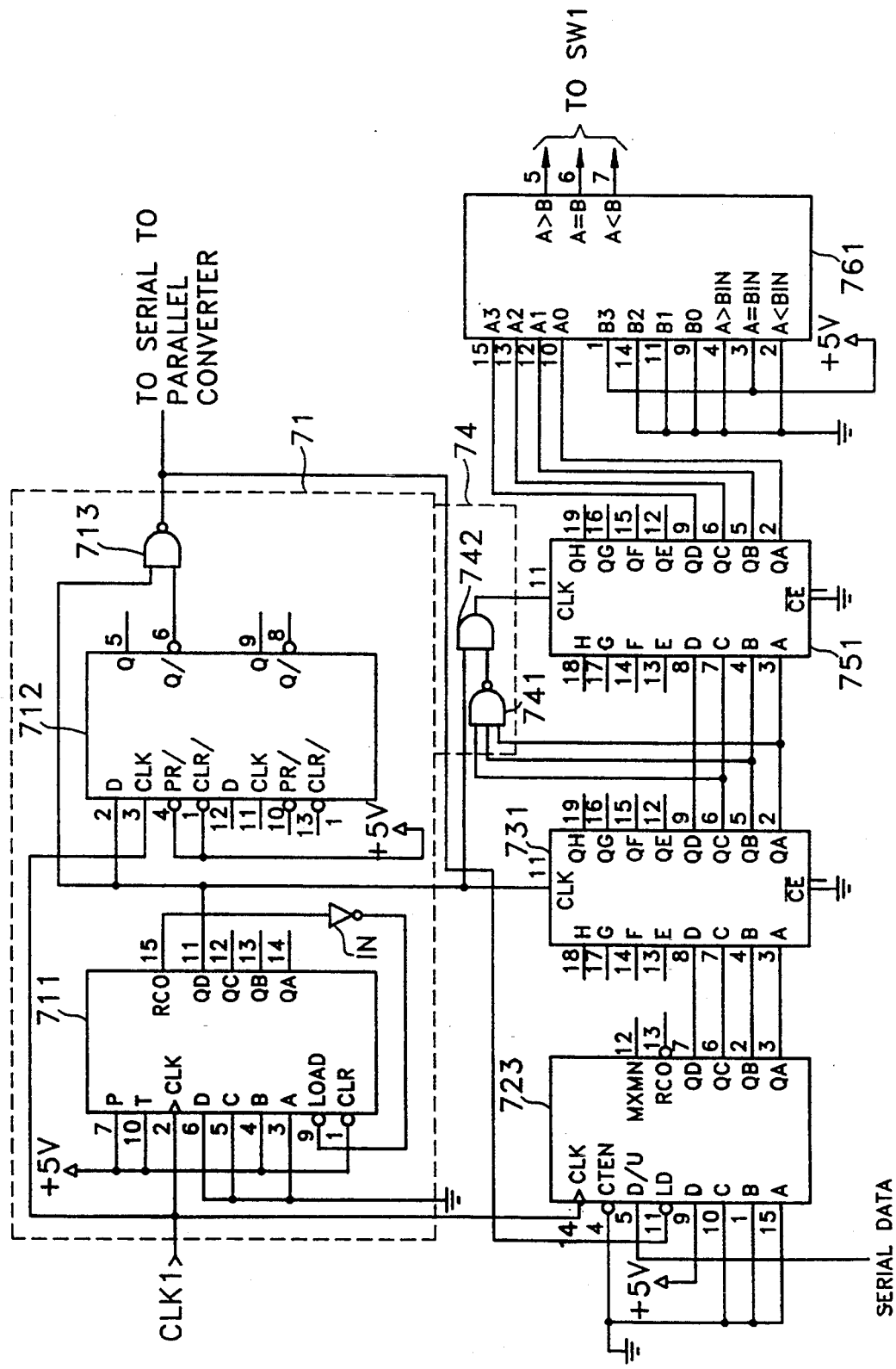
FIG. 6 is a detailed circuit diagram of an embodiment of a DC value calculating circuit according to the present invention shown in FIG. 5.

FIG. 6 is a detailed circuit diagram of an embodiment of CDS calculating circuit 70 according to the present invention.

In FIG. 6, load pulse generator 71 comprises a counter 711 for receiving master clock signal CLK1 as an input signal at a clock terminal, and for loading master clock signal CLK1 by the inverted signal of the output signal of terminal RCO, and for supplying the signal which is obtained by dividing-by-fourteen master clock signal CLK1, a D flip-flop 712 for receiving the output signal of terminal QD of counter 711, a logic device 713 for performing a NAND operation of the signal supplied from terminal Q of D flip-flop 712 and the signal supplied from terminal QD of counter 711.

Counting means 72 comprises a counter 723 of which the reference signal is seven and for counting the master clock signal CLK1 while being loaded by the output signal of logic device 713. Fourth latch 73 comprises a latch circuit 731 for receiving the signal supplied from terminals QA through QD of counter 723 as input signals of input terminals thereof A through D, respectively.

Detector 74 comprises a logic device 741 for performing a NAND operation of output signals of terminals QA through QC of latch circuit 731, and a logic device 742 for executing an AND operation of the output signal of logic device 741, and the divided-by-fourteen clock signal CLK2.

Fifth latch 75 comprises a latch circuit 751 for receiving the signal supplied from terminals QA through QD of latch circuit 73 1 as the input signal of terminals thereof A through D, for receiving the signal supplied from logic device 742 as the input signal of clock terminal CLK.

Comparator 76 of FIG. 5 comprises a comparator 761 for receiving the signal supplied from terminals QA through QD of latch circuit 751 as input signals of terminals thereof A3 through A0, whose reference signal input terminals B3-B0 are applied with a value of decimal 7 as in counter 723. and for outputting a value of the output terminal as a high level signal with respect to the corresponding operation equation by comparing the value applied to terminal A and the value applied to terminal B.

Figure 7:
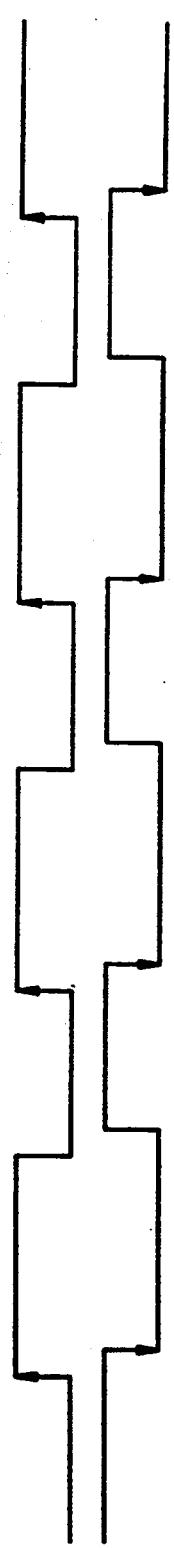
FIGS. 7A through 7K are output waveform diagrams of the respective portions shown in FIG. 6.

FIGS. 7A through 7K are output waveform diagrams of the respective parts shown in FIG. 6. FIG. 7A is a master clock signal CLK1, FIG. 7B is a clock signal CLK2 which is obtained by frequency-dividing-by-fourteen of output signal QD of counter 711, FIG. 7C is an output signal Q/supplied from D flip-flop 712, FIG. 7D is an output signal of logic device 713, FIG. 7E is serial data supplied from serial to parallel converter 60, FIG. 7F is an example of serial data as in FIG. 7E, FIG. 7G shows output signals of terminals QA-QD of counter 723, FIG. 7H is an output waveform diagram of latch circuit 731, FIG. 7I is an output waveform diagram of logic device 74 1, FIG. 7J is an output waveform diagram of latch circuit 751, and FIG. 7K is an output waveform diagram of comparator 761.

Figure 8:
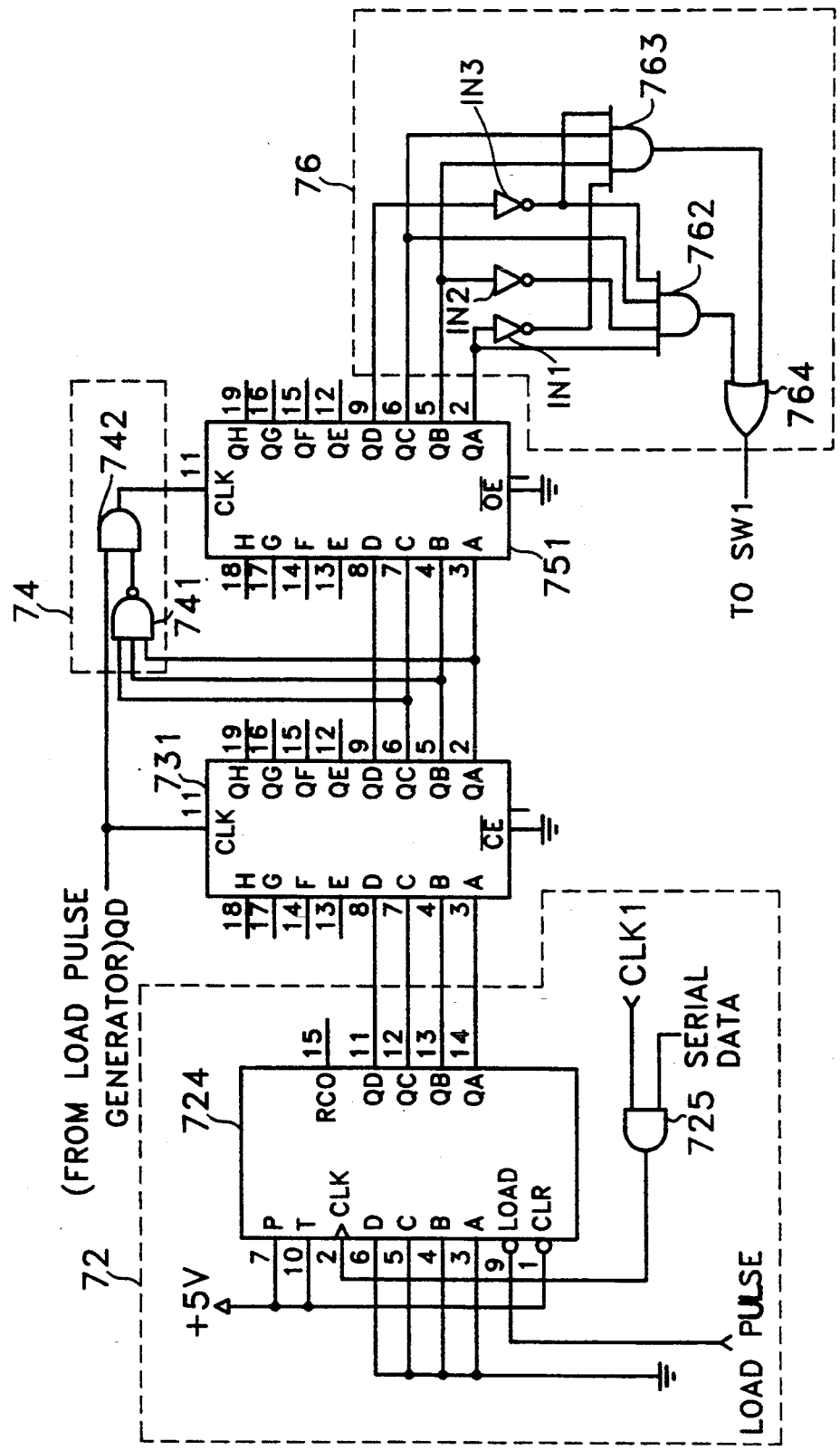
FIG. 8 is a detailed circuit diagram of another embodiment of a DC value calculating circuit according to the present invention shown in FIG. 5.

FIG. 8 is a block diagram of another embodiment of CDS calculating circuit 70 according to the present invention shown in FIG. 5.

In FIG. 8, load pulse generator 71, fourth latch 73, fifth latch 75, detector 74 have the same composition as those of FIG. 6.

Counting means 72 comprises a logic device 725 for executing an AND operation of master clock signal CLK1 and the signal supplied from serial to parallel converter 60, a counter 724 for receiving the output signal of logic device 725 as the input signal of the clock terminal, and for being loaded by the load pulse supplied from load pulse generator 71, and for setting the reference signal applied to terminals A through D to a value of decimal 0.

Comparator 76 comprises an inverter IN1 for inverting output signal QA of latch circuit 75 1, an inverter IN2 for inverting output signal QB, an inverter IN3 for inverting output signal QD, a logic device 762 for executing an AND operation of output signals QA and QC of latch 75 1 and output signals of inverters IN2 and IN3, a logic device 763 for executing an AND operation of outputs of inverters IN2 and IN3 and output signals QB and QC, and a logic device 764 for executing an OR operation of the output signals of logic devices 762 and 763.

FIGS. 9A through 9G are output waveforms of the respective parts shown in FIG. 8. FIG. 9A is master clock signal CLK1, FIG. 9B is serial data supplied from serial to parallel converter 761, FIG. 9C is the signal supplied from logic device 725, FIG. 9D is the signal supplied from the counter 724, FIG. 9E is the output signal of logic device 762, FIG. 9F is the output signal of logic device 763, and FIG. 9G is the output signal of logic device 764.

Then, the operations of the above-described embodiments will be described below in turn.

First of all, the code conversion control apparatus illustrated in FIG. 4 operates as follows. When an information-word is applied as a format of "0000" as shown in FIG. 3, the corresponding negative codeword is output from first look-up table 10 storing the negative codewords among the corresponding information-words, thereby reading a value of "00000," while the corresponding positive codeword, that is, a value of "11111" is read from second look-up table 20 storing positive codewords.

The produced values as described above are synchronized through first latch 30 and second latch 40 respectively so as to be applied to contact points S1 and S2 of selecting means SW1. The operation of selecting means SW1 is controlled by the signals produced in CDS calculation circuit 70, but the "don't care" state is formed in case of the initial information word as described above, so that either of the signals produced by the first and second latches 30 and 40 is selected. Here. selecting means SW1 is controlled to select the negative codeword as shown in FIG. 3D. Accordingly, the reference contact point SO of selecting means SW1 is switched to first contact point S1. Thus, signals produced in first latch 30 are produced via third latch 50 and parallel to serial converter 60.

Parallel to serial converter 60 converts parallel data into serial data and the signals produced in converter 60 are recorded via a recording amplifier (not shown) and simultaneously fed back to CDS calculating circuit 70.

CDS calculating circuit 70 calculates the DC values of serial data applied, and when serial data applied is "00000" as illustrated in FIG. 3, the corresponding CDS values is calculated as a value of decimal −5. Accordingly, currently produced CDS values of the codeword are inclined toward the negative value, so that the control signal is supplied to selecting means SW1 to select the codeword of the following information word as a positive codeword. Consequently, the positive code word "11110" of two codewords corresponding to the following information word "0001" is supplied via second latch 40 and selecting means SW1 to third latch 50.

The codeword applied to third latch 50 is converted to the serial data format in the same manner as that described above to be applied to the recording amplifier (not shown) and CDS calculation circuit 70, so that the above operations are performed repeatedly therein. Accordingly, the codeword corresponding to the information word is selected and as a result, the DSV value approaches "zero" as illustrated in FIG. 3E. That is, it is controlled to select the present codeword according to the CDS value of the previous codeword.

FIG. 5 illustrates CDS calculation circuit 70 according to the present invention, of which the operation is as follows.

First of all, load pulse generator 71 controls loading of parallel to serial converter 60 when a parallel symbol word is converted into a serial symbol word, and also controls counter 721 to load the reference signals produced in reference signal generator 722.

Counting means 72 counts up and down the codeword applied as the serial data from parallel to serial converter 60 via an up/down counter 721 by the principle of calculating the CDS values as described in reference with FIG. 1. The reference value starting the up-/down count corresponds to the value produced in reference signal generator 722. As a result, counter 721 loads the reference value before starting the up/down count depending on the load pulse produced in load pulse generator 71. The CDS value calculated per one codeword is supplied to fourth latch 73 which temporarily stores the calculated CDS value and then outputs the stored value.

The output signal of fourth latch 73 is applied to fifth latch 75 and detector 74. When the value output from fourth latch 73 is identical to the value of the reference signal output from reference signal generator 722, it means that the DSV values of the codeword is identical to "zero" (that is, the number of binary "1" and the number of binary "0" in the codeword are the same). Accordingly, the CDS value of the codeword before the previous codeword needs to be maintained. For this purpose, in case that CDS value is equal to "zero" in detector 74, the clock of fifth latch 75 is controlled not to operate, so that the output signal of fifth latch 75 is constant. The output signal of fifth latch 75 is applied to comparator 76.

Comparator 76 compares the output signal of the fifth latch 75 with the value of the reference signal identical to that of the reference signal used in counter 721. If the output signal of fifth latch 75 is greater than the value of the reference signal, the CDS of the codeword is determined to be positive and otherwise, the CDS is determined to be negative. Accordingly, if the CDS value of the previous codeword is positive, the switching in selecting means SW1 is controlled that the negative codeword is selected as the current codeword, and if the CDS value of the previous codeword is negative, the switching thereof is controlled that the positive codeword is selected as the current codeword. Selecting means SW1 is switched into first contact point S1 when the negative codeword is selected, and it is switched into second contact point S2 when the positive codeword is selected.

FIG. 6 shows a detailed circuit diagram of an embodiment of CDS calculating circuit 70 according to the present invention as illustrated in FIG. 5, and the embodiment is explained referring to FIGS. 7A to 7K. Herein, an information word applied is formed in eight-bit and a codeword converted is formed in 14-bit.

First of all, load pulse generator 71 produces the values for counting repeatedly from 2 to F master clock signal CLK1 as shown in FIG. 7A having applied to counter 711, via output terminals QA, QB, QC and QD. Here, the signal from output terminal QD is applied to input terminal D of D flip-flop 712. The signal of output terminal QD is produced as illustrated in FIG. 7B.

D flip-flop 712 produces a high logic signal to its output terminal Q/since the signal applied to input terminal D is a low logic signal until the fifth master clock pulse is produced, and then since the logic of the signal applied to input terminal D is converted into a high logic according to counting of the sixth clock signal. Accordingly, when the pulse of seventh master clock signal CLK1 is produced, the logic of the output signal from output terminal Q/is converted into a low logic. Thus, the signal produced from output terminal Q/in D flip-flop 712 is the signal in which the signal produced in counter 711 is delayed by a clock cycle of master clock signal CLK1 as shown in FIG. 7C.

Logic device 713 performs the NAND operation of the output signal Q/(FIG. 7C) in D flip-flop 712 and the output signals QD (FIG. 7B) in counter 711. The signal produced from logic device 713 is represented as illustrated in FIG. 7D. In FIG. 7D, a load pulse is produced as a clock CLK1 interval per a falling edge of the output signal QD of counter 711. The load pulse is applied to parallel to serial converter 60 to load the codeword of fourteen bits applied during a low period and to then shift the codeword thereof until thirteen clock pulses are produced, and then when the parallel data is applied to serial to parallel converter 60, the load pulse performs the loading repeatedly.

The serially-converted data is applied to the up-/down controlling terminal of counter 723, and the counter 723 loads the preset reference value in the falling edge of the pulse produced in load pulse generator 71, and also counts up and down the loaded value according to the condition of the serial data applied. Here, the preset values are applied in terminals A, B, C and D equal to a value of decimal 7.

Then, the codeword of 14 bits produced in serial to parallel converter 60 is generated in the same period as that illustrated in FIG. 7E, and when the value of the generated codeword is the same as that illustrated in FIG. 7F, counter 723 counts up and down the value of the serial to parallel data applied to up/down controlling terminal to the loaded value of decimal 7. Here, on the contrary to the above description, when the value of the codeword is equal to "0," counting is performed for the adding operation of "0," and when it is equal to 1, counting is performed for the subtracting operation of "1." Accordingly, when the serial data applied is "01111110000000" as shown in FIG. 7F, the resultant value in counter 723 is the same as that shown in FIG. 7G.

Latch circuit 731 stores temporarily the final count result value of decimal 9, which is synchronized by a divided-by-fourteen clock signal CLK2 produced in load pulse generator 71 and is produced as illustrated in FIG. 7G and supplies the stored value to a latch circuit 751 and detector 74.

Detector 74 controls the signal supplied from latch circuit 731 not to transmit into latch circuit 751 when the signal produced from latch circuit 731 is identical to "zero." That is, logic device 741 performing the NAND operation of signals QA, QB, and QC in latch circuit 731 produces a low logic signal if all of the above signals from latch circuit 731 are high, and otherwise, the logic device 741 produces a high logic signal. When all of the above outputs in latch circuit 731 are high, the output value is equal to decimal 7. However, as illustrated in FIG. 7H, since the value counted for the previous codeword is decimal 9, logic device 741 produces a high logic signal. Accordingly, logic device 741 receiving the output signal of logic device 741 and the divided-by-fourteen clock signal CLK2, so as to perform an AND operation, produces the divided-by-fourteen clock signal CLK2 as it is.

Accordingly, latch circuit 751 holds the output signal from latch circuit 731 and also supplies the held signal to input terminals A3, A2, A1 and A0 of comparator 761. The current values applied to A3, A2, A1, and A0 are equal to decimal 9. Comparator 751 has the same reference value as that in counter 723 in its input terminal B so that the value applied to input terminal A is greater than that to input terminal B. Consequently, it is concluded that the CDS value of the previous codeword is greater than "0," and this means the number of binary "0" is greater than that of binary "1."

Thus, the control signal is supplied to selecting means SW1 in order that the negative codeword generated in first lock-up table 10 is selected as the code word corresponding to the current information word. The first contact point in selecting means SW1 is established as a high logic terminal, so that the high signal is applied from CDS calculating circuit 70 to control the operation as described the above, as illustrated in FIG. 7K.

On the other hand, when the value counted in counter 723 is decimal 7 identical to the second counted result value in FIG. 7H, a NAND device 741 in detector 74 generates a low logic signal so that an AND device 742 cuts off the clock signal applied to other input terminals and as a result, latch circuit 751 maintains the value of the codeword before the previous codeword. Accordingly, the value is applied to comparator 761 as it is and selecting means SW1 is controlled according to the above-described conclusion.

However, when the counted value in counter 723 is decimal 3 as in the third codeword, the output signal from NAND device 741 in detector 74 generates a high logic signal so that divided-by-fourteen clock signal CLK2 is generated as it is. Accordingly, latch circuit 751 holds the output signal from latch circuit 731 and also supplies the held signal to comparator 761. Comparator 761 concludes that the CDS value of the previous codeword is smaller than "zero," since the value of the signal applied to input terminal A is smaller than a reference value applied to input terminal B, so as to control the operation of selecting means SW1 by producing the low logic signal as illustrated in FIG. 7K, in order that the positive codeword is selected as a current codeword.

That is, in the embodiment as illustrated in FIG. 6, in case that the number of the bits constituting the codeword increases, all are applicable as they are except that only one counter is more added.

FIG. 8 is a detailed circuit diagram of another embodiment of CDS calculating circuit 70 according to the present invention as illustrated in FIG. 5 and the embodiment is explained referring to FIGS. 9A to 9G.

In FIG. 8, detector 74, latch circuits 731 and 751 shown in FIG. 6 are applicable as they are. Accordingly, the more detail explanation thereof is omitted and only the different portions from FIG. 6 are explained.

Counting means 72 transmits master clock signal CLK1 as illustrated in FIG. 9C at the interval where the serial data produced in serial to parallel converter 60 by logic device 725 is applied as a high logic signal as in FIG. 9B. The transmitted signal is applied to counter 724. Counter 724 loads the reference signal by the load pulse signal as in counter 723 illustrated in FIG. 6. However, the reference value desired to be loaded is equal to a value of "zero" since input terminals A, B, C and D are connected to the ground. Counter 724 loaded as "zero" counts the counting value applied to the clock terminal as illustrated in FIG. 9D.

Accordingly, when the first counted value is equal to decimal 5 as shown in FIG. 9D, latch circuit 731 produces the value. Therefore, detector 74 and latch circuit 751 operate in the same way as described above, so that the output signal is supplied to comparator 76. The value produced in latch circuit 751 is decimal 5 and then the output signals in output terminals QA, QB, QC and QD are "1010," so that logic device 762 produces a high logic signal as illustrated in FIG. 9E. On the other hand, logic device 763 produces a low logic signal as illustrated in FIG. 9F. Therefore, logic device 764 controls selecting means SW1 to be switched to the second contact point, since the signal produced from logic device 762 is high and it means that in the previously produced codeword the number of binary "0" is greater than that of binary "1," so that logic device 764 transmits the positive codeword as the current codeword to third latch 50.

However, when the counted result value is produced as in the third waveform of FIG. 9D, each value of QA, QB, QC and QD produced in latch circuit 751 is "1110." Accordingly, logic device 762 produces a low logic signal, logic device 763 produces a low logic signal and also logic device 764 produces a low logic signal, so that on the contrary to the above description, selecting means SW1 is controlled to select the negative codeword.

That is, in the embodiment as illustrated in FIG. 8, there is an advantage that even if the number of the bits forming the codeword increases, the operation is acceptable without adding the components.

As described above, the DC value calculating circuit according to the present invention has the advantages that the CDS calculation easily operates and also the elements constituting the circuit is not varied according as the number of the bits of the codeword increases or decreases, since the number of bits of the codeword used for calculating the CDS value is small, when the codeword corresponding to the information word applied by a channel coding method in a digital recording and reproducing system is converted.

While the present invention is disclosed and described with reference to two preferred embodiments, it is well appreciated that any person who is skilled in the art to which the present invention pertains can variously modify the constitution and the detailed matter of the invention, without departing from the spirit of this disclosure and the scope of the appended claims.

What is claimed is:

1. A circuit for calculating a DC value for use in a digital recording and reproducing system having first storing means for mapping plural codewords (symbol words) to an information-word and storing the codeword whose DC value is positive among the plural codewords corresponding to said information-word in order to control the code conversion for selecting the optimum codeword in a recording and reproducing operation, second storing means for storing the codeword whose DC value is negative among the plural codewords, parallel to serial converting means for converting the signal supplied from said first storing means or said second storing means to a format of serial data, selecting means for selectively supplying the signals output from said first storing means and said second storing means to the serial to parallel converting means, a DC value calculating circuit for calculating said DC value of the currently output codeword using the signal supplied from said parallel to serial converting means, and supplying a control signal to the selecting means to select the signal to be supplied to the parallel to serial converting means among the plural codewords corresponding to an information-word following the current information-word, said DC value calculating circuit comprising:

a load pulse generator for generating a second clock signal and a load pulse frequency-divided by a predetermined value by a master clock signal;

a counter for loading a reference value therein in response to said load pulse from said load pulse generator, and for counting up/down the serial data supplied from said parallel to serial converting means;

a detector for detecting whether or not the value counted in said counting means is the same as said reference value;

third storing means for holding a previous input value when the reference value is the same as the value counted in said counter, and for storing the value counted in said counting means when said reference value is not the same as the value counted in said counter; and a comparator for comparing the magnitude of the signal supplied from said third storing means with the magnitude of said reference value and supplying the result of said comparison as a signal for controlling the operation of said selecting means.

2. The circuit for calculating a DC value in a digital recording and reproducing system as claimed in claim 1, wherein said load pulse generator comprises:

a counter for receiving said master clock signal and producing a second clock signal which is frequency-divided by a predetermined value;

a delay device for receiving said second clock signal from said counter, and delaying the same in one clock period of said master clock; and a logic device for performing an AND operation on the output signal of said delay device and said second clock signal, to thereby produce the load pulse.

3. The circuit for calculating a DC value in a digital recording and reproducing system as claimed in claim 1, wherein said detector comprises a first logic device for performing a NAND operation on the output value of said counter; and a second logic device for performing an AND operation on the output signal of said first logic device and said second clock signal, to thereby produce a signal for controlling the operation of said third storing means according to the output signal of said first logic device.

4. The circuit for calculating a DC value for use in a digital recording and reproducing system as claimed in claim 1, wherein said counter comprises a logic device for performing an AND operation on said master clock signal and the signal supplied from said serial to parallel converting means, to thereby produce said master clock signal where said serial data is in a high state; and a counter for receiving a predetermined reference value according to the load pulse generated by said load pulse generator 71, to thereby count the clock signal from said logic device.

5. The circuit for calculating a DC value for use in a digital recording and reproducing system as claimed in claim 1, wherein said comparator comprises a plurality of inverters for inverting the state of the predetermined bits of the output signal of said third storing means; a plurality of logic devices for performing AND operations for the output signals of said inverters and said third storing means; and a logic device for performing an OR operation for the output signal of said plurality of said logic devices, to thereby produce a control signal for controlling the operation of said selecting means.

* * * * *